(No Model.)
J. H. LANE.
HORSE DETACHER.
No. 477,664. Patented June 28, 1892.
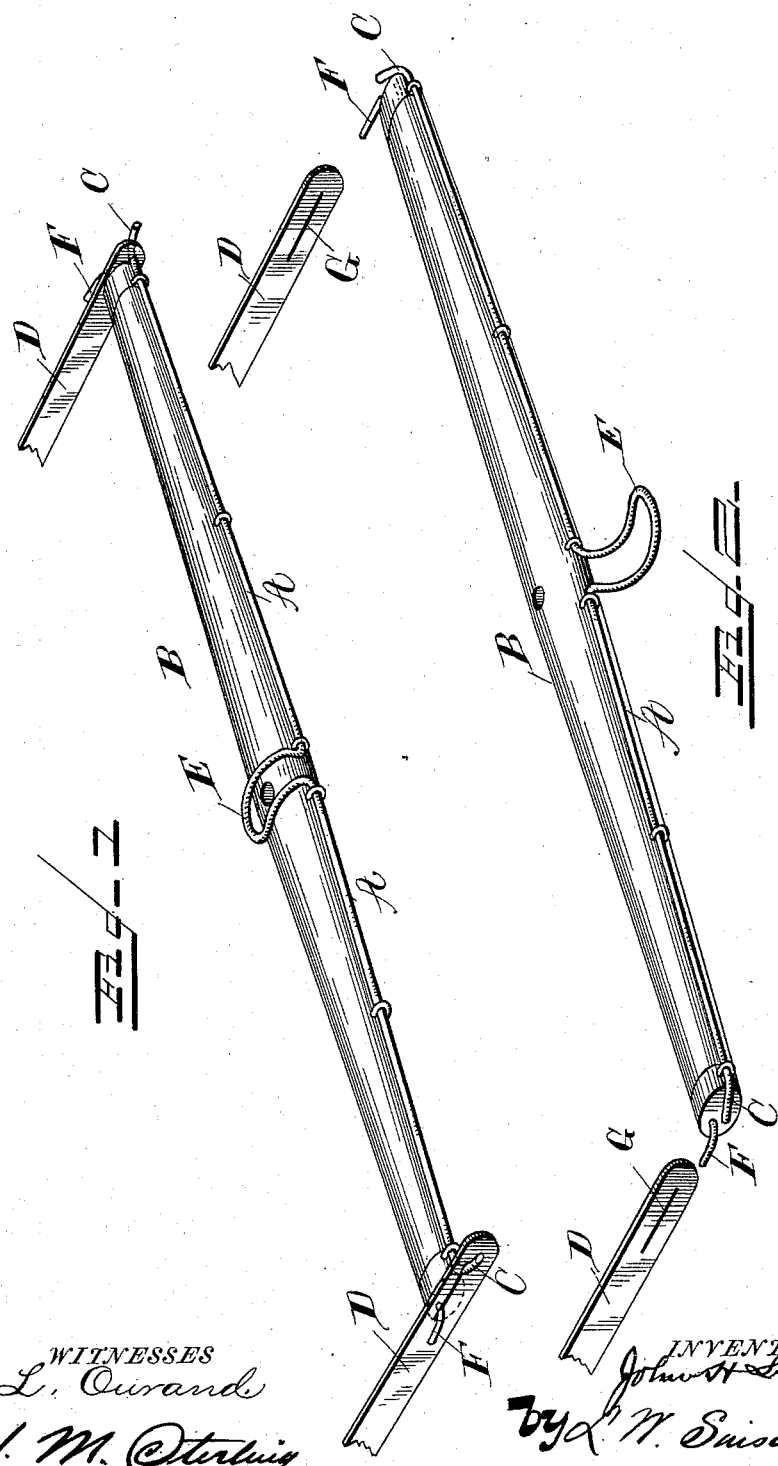
WITNESSES
F. L. Durand
N. M. Sterling
INVENTOR
John H. Lane
by L. W. Snisabaugh
Attorney
THE NORRIS PETERS CO., PHOTO-LITHO., WASHINGTON, D. C.

UNITED STATES PATENT OFFICE.

JOHN H. LANE, OF ESMONT, VIRGINIA.

HORSE-DETACHER.

SPECIFICATION forming part of Letters Patent No. 477,664, dated June 28, 1892.

Application filed August 18, 1891. Serial No. 403,046. (No model.)

*To all whom it may concern:*

Be it known that I, JOHN H. LANE, a citizen of the United States, and a resident of Esmont, in the county of Albemarle and State of Virginia, have invented new and useful Improvements in Detaching Devices; and I do hereby declare the following to be a full, clear, and exact description of said invention, reference being had to the accompanying drawings, and to the letters of reference marked thereon, which form a part of this specification.

This invention relates to new and useful improvements in devices for detaching horses from vehicles when the horses are running away or when occasion may require it.

The object of the invention is to provide the whiffletree of the vehicle with a simple arrangement which will take the place of the ordinary trace-hooks and be operated in such a manner that the traces will be free to come off with the slightest pull when the detaching device is operated.

The invention consists in combining with the whiffletree having stationary hooks in the ends thereof and turned in a forward direction a rod having its ends bent into hook form and adapted to be turned by means of a lever, so that the hooks or bent ends will be brought from their normal position, in which they have a rearward direction, to the reverse thereof, or in line with the pull of the traces, and permit the traces to be released therefrom.

Referring to the accompanying drawings, Figure 1 is a perspective view of the whiffletree having my improved detaching device applied thereto, the same being shown in its normal position. Fig. 2 is a similar view as that shown in Fig. 1, but in which the detaching device is shown in its turned position releasing the traces.

The rod A is secured to the rear side of the whiffletree B in such manner as to permit it to be partially turned in order to reverse the direction of the hooks C, to which the traces D are attached. The rod A is made of a length equal to that of the whiffletree and is preferably bent up at its center in the form of a loop E, which makes a convenient form of lever by which to operate the turning of the rod when it is desired to reverse the direction of the hooks C. To the loop or lever E is connected a suitable cord or chain, which has its other end fastened within convenient reach of the driver. This, as is the common practice, is the manner of applying power to the lever E for turning the hooks C.

At each end of the whiffletree is secured a stationary hook F, which is turned in a forward direction, or in line with the pull of the traces, and these hooks, acting in conjunction with the reversible hooks C, make it impossible for the traces to become accidentally detached, while when it is desired to release the traces therefrom not the slightest hinderance is offered, as both hooks are then turned in a direction corresponding with the line of pull.

The slit G in the end of the traces is formed of such size as will not permit the hooks F and C to be inserted while in their normal position, as shown in Fig. 1, but will necessitate the turning of the hook C partly in a forward direction before the trace can be attached.

It will be seen from the above that very little power is required to detach the horse from the vehicle, as it is merely necessary to turn the rod A in the slit G to bring the hook in a reverse direction and leaving no hinderance to the traces.

Having thus described my invention, what I claim, and desire to secure by Letters Patent, is—

A horse-detaching device consisting of a whiffletree having a forwardly-extending stationary hook at each end, in combination with a rotatable rod having rearwardly-extending hooks held in keepers on the whiffletree, said rod being provided with a lever adapted to be operated by a suitable device for raising the same and turning the rearwardly-extending hooks forward to allow the traces to be readily attached and detached, both stationary and movable hook being adapted to be inserted in the slit in the trace, substantially as described, and for the purpose set forth.

In testimony whereof I affix my signature in presence of two subscribing witnesses.

JOHN H. LANE.

Witnesses:
THOMAS H. BEASLEY,
HENRY L. LANE.